US012409672B2

United States Patent

(12) United States Patent
Naoi et al.

(10) Patent No.: US 12,409,672 B2
(45) Date of Patent: Sep. 9, 2025

(54) IMAGE FORMING APPARATUS AND CONTROL METHOD OF IMAGE FORMING APPARATUS

(71) Applicant: Konica Minolta, Inc., Tokyo (JP)

(72) Inventors: Shinya Naoi, Tokyo (JP); Sho Okuzawa, Tokyo (JP); Sho Soda, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 192 days.

(21) Appl. No.: 18/317,454

(22) Filed: May 15, 2023

(65) Prior Publication Data

US 2023/0373231 A1 Nov. 23, 2023

(30) Foreign Application Priority Data

May 18, 2022 (JP) ................................ 2022-081574

(51) Int. Cl.

*B65H 19/20* (2006.01)
*B41J 15/16* (2006.01)
*G03G 15/00* (2006.01)

(52) U.S. Cl.

CPC .............. *B41J 15/16* (2013.01); *B65H 19/20* (2013.01); *G03G 15/6517* (2013.01); *G03G 15/652* (2013.01)

(58) Field of Classification Search

CPC ... B41J 15/16; G03G 15/6517; G03G 15/652; B65H 19/20

See application file for complete search history.

(56) References Cited

U.S. PATENT DOCUMENTS

2003/0209629 A1* 11/2003 Hirata ................ B65H 19/1852 242/554.2
2007/0051264 A1* 3/2007 Sakamoto ................ B41J 15/16 101/484
2016/0136976 A1* 5/2016 Shinjo ...................... B41J 15/16 347/104

FOREIGN PATENT DOCUMENTS

JP 2004035226 A * 2/2004 ........... B65H 23/182
JP 2018005194 A 1/2018

* cited by examiner

*Primary Examiner* — Yaovi M Ameh
(74) *Attorney, Agent, or Firm* — CANTOR COLBURN LLP

(57) ABSTRACT

An image forming apparatus includes: a main part that forms an image on a continuous medium in a state in which a tension is applied to the continuous medium, the continuous medium being fed from a first roll and conveyed to be taken up on a second roll; and a tension maintaining part that maintains the tension of the continuous medium at the main part during a manipulation for replacing at least one of the first roll and the second roll.

16 Claims, 11 Drawing Sheets

1

IMAGE FORMING APPARATUS AND CONTROL METHOD OF IMAGE FORMING APPARATUS

CROSS REFERENCES TO RELATED APPLICATIONS

The present invention claims priority under 35 U.S.C. § 119 to Japanese Application, 2022-081574, filed on May 18, 2022, the entire contents of which being incorporated herein by reference.

BACKGROUND

Technological Field

The present invention relates to an image forming apparatus and a control method of the image forming apparatus.

Description of Related Art

In some image forming apparatuses such as those of an electrophotographic system and an ink jet system, a continuous medium such as a roll sheet or a continuous form is conveyed in a roll-to-roll manner to form an image on the conveyed continuous medium.

In the image forming apparatuses described above, the continuous medium is conveyed while a predetermined tension is applied to the continuous medium such that the continuous medium can be conveyed along a conveyance path. This prevents the continuous medium from entering a portion other than the conveyance path.

For example, in the image forming apparatuses such as those of an electrophotographic system or an inkjet system, there is a possibility that a conveyance trouble such as a jam may occur when the continuous medium enters the portion other than the conveyance path. Further, the image forming apparatuses of the electrophotographic system include a fixing part for fixing a formed image, and when the continuous medium enters a high-temperature portion of the fixing part, the continuous medium may be deformed or discolored.

In order not to cause the above-described problems, a predetermined tension is applied to the continuous medium and image formation is performed by controlling the fixing part to a predetermined temperature only when the predetermined tension is applied to the continuous medium.

The above-described image forming apparatuses include a supply roll that supplies the continuous medium to an apparatus main part, a take-up roll that takes up the continuous medium supplied to the apparatus main part, and/or the like. The supply roll is replaced in accordance with, for example, the remaining amount of the continuous medium in the supply roll, and the take-up roll is replaced in accordance with, for example, the take-up amount of the continuous medium in the take-up roll.

In the above-described image forming apparatuses, when the supply roll or the take-up roll is replaced, the continuous medium is cut in the vicinity of the supply roll or the take-up roll. Accordingly, a predetermined tension cannot be applied to the continuous medium. For example, in an image forming apparatus disclosed in Japanese Patent Application Laid-Open No. 2018-005194, a fixing part is brought into a stopped state in order to reduce deformation or the like of the continuous medium in a case where a predetermined tension cannot be applied to the continuous medium as described above.

Meanwhile, since a predetermined tension cannot be applied to the continuous medium at the time of roll replacement as described above, a configuration related to image formation, for example, the fixing part or the like, is brought into the stopped state. Since the configuration related to the image formation is in the stopped state, a preliminary operation for stabilizing the configuration related to the image formation (for example, warm-up for raising the temperature of the fixing part to a predetermined temperature, or the like) is required after the roll replacement. The preliminary operation requires a long waiting time before completion of the preliminary operation, and when the preliminary operation is performed after the roll replacement, the downtime of the apparatus becomes longer. Therefore, it is demanded that the preliminary operation can be performed without stopping the configuration related to image formation at the time of roll replacement, and the downtime of the apparatus is reduced.

SUMMARY

An object of the present invention is to provide an image forming apparatus and a control method of the image forming apparatus capable of reducing downtime of the apparatus.

An image forming apparatus in which one aspect of the present invention is reflected in an attempt to at least partly achieve the above-mentioned object includes:

a main part that forms an image on a continuous medium in a state in which a tension is applied to the continuous medium, the continuous medium being fed from a first roll and conveyed to be taken up on a second roll; and a tension maintaining part that maintains the tension of the continuous medium at the main part during a manipulation for replacing at least one of the first roll and the second roll.

A control method of an image forming apparatus in which one aspect of the present invention is reflected in an attempt to at least partly achieve the above-mentioned object includes:

forming an image on a continuous medium by a main part in a state in which a tension is applied to the continuous medium, the continuous medium being fed from a first roll and conveyed to be taken up on a second roll:

operating a tension maintaining part to maintain the tension of the continuous medium at the main part during a manipulation for replacing at least one of the first roll and the second roll.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
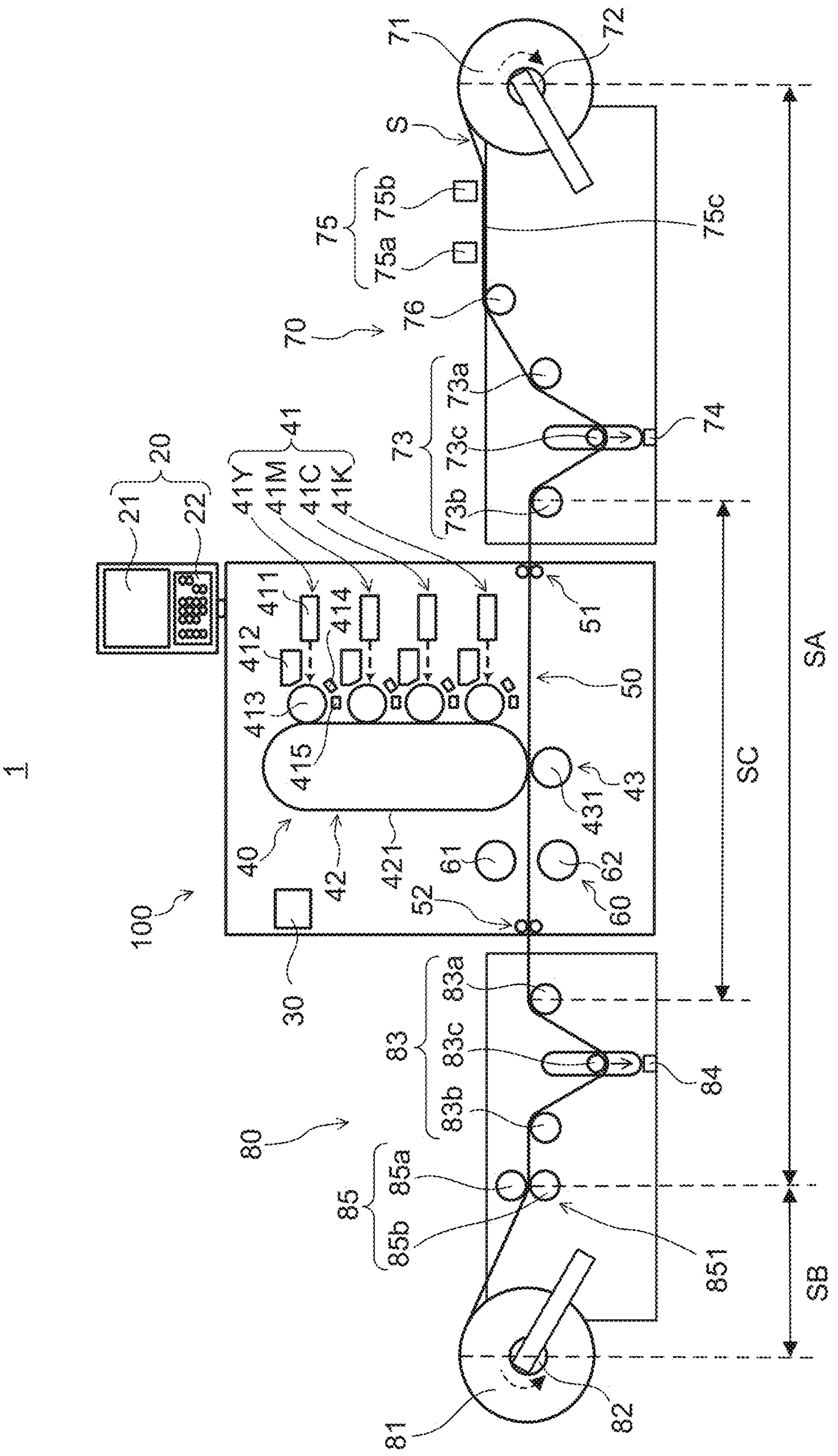
FIG. 1 is a diagram schematically illustrating an overall configuration of an image forming apparatus according to an embodiment of the present invention and illustrates a printing standby state of the apparatus.

Hereinafter, one or more embodiments of the present invention will be described with reference to the drawings. However, the scope of the invention is not limited to the disclosed embodiments.

Hereinafter, an embodiment of the present invention will be described in detail with reference to the drawings.

Configuration of Image Forming Apparatus

FIG. 1 to FIG. 4 are diagrams schematically illustrating the entire configuration of image forming apparatus 1 according to the present embodiment, and respectively illustrate a printing standby state, a printing state, a roll replacement state, and a steady state of the image forming apparatus. FIG. 5 is a block diagram illustrating a principal part of a control system of image forming apparatus 1 according to the present embodiment.

Image forming apparatus 1 is capable of forming an image on continuous medium S, which is, for example, a continuous sheet, cloth (fabric), recording medium made of resin, or the like. Accordingly, as illustrated in FIGS. 1 to 4, image forming apparatus 1 includes image-forming-apparatus main part 100 (the main part in the present invention), supply part 70, and collection part 80. Supply part 70 supplies continuous medium S wound in a roll form to image-forming-apparatus main part 100, and collection part 80 collects continuous medium S in a roll form from image-forming-apparatus main part 100.

Image-forming-apparatus main part 100 is a color image forming apparatus of an intermediate transfer system using electrophotographic process technology. That is, image-forming-apparatus main part 100 transfers (primary-transfers) toner images of colors of CMYK formed on a photoconductor to an intermediate transfer member and superimposes the toner images of the four colors on one another on the intermediate transfer member. Then, image-forming-apparatus main part 100 secondary-transfers the resultant image to continuous medium S, thereby forming an image. Note that, "CMYK" represents C (cyan), M (magenta), Y (yellow), and K (black).

A longitudinal tandem system is adopted for image-forming-apparatus main part 100. By way of example, in the longitudinal tandem system, the respective photoconductors corresponding to the four colors of CMYK are placed in series in the travelling direction of the intermediate transfer member, and the toner images of the four colors are sequentially transferred to the intermediate transfer member in one cycle.

As illustrated in FIG. 5, image forming apparatus 1 includes operation/display part 20, image processing part 30, image forming part 40, conveyance part 50, fixing part 60, supply part 70, collection part 80, control part 200 (hardware processor), communication part 211, storage part 212, and the like.

Control part 200 includes central processing unit (CPU) 201, read only memory (ROM) 202, random access memory (RAM) 203 and the like. CPU 201 reads a program suited to processing contents out of ROM 202, loads the program into RAM 203, and integrally controls an operation of each block of image forming apparatus 1 in cooperation with the loaded program. Upon this control, various data such as a Look Up Table (LUT) stored in storage part 212 is referred to. Storage part 212 is composed of, for example, a non-volatile semiconductor memory (so-called flash memory) or a hard disk drive.

Control part 200 transmits and receives various data to and from an external apparatus (for example, a personal computer) connected to a communication network such as a local area network (LAN) or a wide area network (WAN), through communication part 211. Control part 200 receives, for example, image data transmitted from the external apparatus, and performs control to form an image on continuous medium S based on this image data (input image data). Communication part 211 is composed of, for example, a communication control card such as a LAN card.

Control part 200 is connected with an operation/display part 20, image processing part 30, image forming part 40, conveyance part 50, fixing part 60, supply part 70, collection part 80, communication part 211, and storage part 212. These parts perform predetermined processing based on an instruction from control part 200.

In image-forming-apparatus main part 100, operation/display part 20 includes, for example, a liquid crystal display (LCD) provided with a touch panel, and functions as display part 21 and operation part 22. Display part 21 displays various operation screens, image conditions, operating statuses of each function, and/or the like in accordance with display control signals input by control part 200. Operation part 22 equipped with various operation keys, such as a numeric keypad and a start key, receives various input operations by users and outputs operation signals to control part 200.

Image processing part 30 includes a circuit and/or the like that, in accordance with default settings or user settings, performs predetermined image processing on input image data transmitted, for example, from an external apparatus. Image forming part 40 is controlled based on the image data that has been subjected to the image processing.

Image-forming-apparatus main part 100 may include an image reading part including an Auto Document Feeder (ADF), document image scanning device (scanner), and the like. The auto document feeder conveys, with a conveyance part, a document placed on a document tray, to send out the document to the document image scanner. The document image scanner optically scans the document conveyed from the auto document feeder to read a document image. Then, the image reading part generates input image data based on a result read by the document image scanner. In this case, image processing part 30 may perform the above-described predetermined image processing on the input image data generated by the image reading part.

Image forming part 40 includes image forming unit 41, intermediate transfer unit 42, secondary transfer unit 43, and the like. Based on the image data from the image processing part 30, image forming unit 41Y forms an image of a Y-component colored toner. Similarly, image forming unit 41M forms an image using an M-component colored toner, image forming unit 41C forms an image using a C-component colored toner, and image forming unit 41K forms an image using a K-component colored toner.

Image forming units 41Y, 41M, 41C, and 41K have the same configuration. Specifically, image forming units 41Y, 41M, 41C, and 41K include exposing devices 411, developing devices 412, photoconductor drums 413, charging devices 414, drum cleaning devices 415, and the like, respectively. In FIG. 1 to FIG. 4, reference numerals of the exposing devices, the developing devices, the photoconductor drums, the charging devices, and the drum cleaning devices in image forming units 41M, 41C, and 41K are omitted. Further, a known technique can be employed as exposing devices 411, developing devices 412, photoconductor drums 413, charging devices 414, and drum cleaning devices 415, and thus detailed description thereof is omitted here.

Intermediate transfer unit 42 includes intermediate transfer belt 421 and the like. Intermediate transfer belt 421 is wound under tension around a plurality of support rollers in a loop form and travels in the direction of arrow A (see FIG. 2). The plurality of support rollers include rollers such as a backup roller, a primary transfer roller, and a driving roller. Illustration of these rollers are omitted here. Intermediate transfer belt 421 is brought into pressure contact with photoconductor drums 413, whereby toner images from photoconductor drums 413 are transferred to intermediate transfer belt 421.

Note that intermediate transfer unit 42 may be configured to include a belt cleaning device including a plate-shaped belt cleaning blade or the like that makes sliding contact with the surface of intermediate transfer belt 421. The belt cleaning device removes transfer residual toner and the like remaining on the surface of intermediate transfer belt 421 after the secondary transfer.

Secondary transfer unit 43 includes secondary transfer roller 431 and the like. Secondary transfer roller 431 is pressed against intermediate transfer belt 421. As a result, a secondary transfer nip is formed between intermediate transfer belt 421 and secondary transfer roller 431.

In secondary transfer unit 43, when continuous medium S is conveyed to the secondary transfer nip, the toner images of the respective colors carried on intermediate transfer belt 421 are collectively transferred onto continuous medium S. Continuous medium S on which the toner image is transferred is conveyed toward fixing part 60 by secondary transfer roller 431.

Secondary transfer unit 43 may be a belt-type secondary transfer unit having a secondary transfer belt or the like wound under tension around a plurality of support rollers, instead of a roller-type secondary transfer unit having secondary transfer roller 431 or the like.

Conveyance part 50 includes a plurality of conveyance rollers 51 and 52, a conveyance guide, and the like, although a part of the conveyance part is not illustrated. Conveyance part 50 conveys continuous medium S supplied from supply part 70 to image forming part 40 (secondary transfer nip) and fixing part 60. Then, continuous medium S on which an image is formed via image forming part 40 (secondary transfer nip) and fixing part 60 is conveyed to collection part 80.

Fixing part 60 includes fixing roller 61, pressurizing roller 62, and the like. Fixing roller 61 and pressurizing roller 62 are configured to vertically move to be separated from continuous medium S or to nip continuous medium S.

Fixing roller 61 is heated to a predetermined fixing temperature, and pressurizing roller 62 forms a fixing nip for nipping and conveying continuous medium S between the pressurizing roller and fixing roller 61. In this fixing part 60, conveyed continuous medium S on which toner images are secondary-transferred is heated and pressurized at the fixing nip, to fix the toner images on continuous medium S.

Supply part 70 is disposed on the upstream side of image-forming-apparatus main part 100 in conveyance direction T (see FIG. 2) in which continuous medium S is conveyed. Supply part 70 includes first roll 71, tension applying part 72, tension adjustment part 73, tension detection part 74, splice table 75, driven roller 76, and the like.

The configuration and operation of supply part 70 will be described later. Supply part 70 is configured to feed continuous medium S wound around first roll 71 in a state where a predetermined tension is applied to the continuous medium, to supply continuous medium S to image-forming-apparatus main part 100.

Collection part 80 is disposed on the downstream side of image-forming-apparatus main part 100 in conveyance direction T. Collection part 80 includes second roll 81, tension applying part 82, tension adjustment part 83, tension detection part 84, nip rollers 85, and the like.

The configuration and operation of collection part 80 will be described later. Collection part 80 is configured to collect continuous medium S by taking up, on second roll 81, continuous medium S on which an image is formed in image-forming-apparatus main part 100 and that is discharged from image-forming-apparatus main part 100, in a state where a predetermined tension is applied to the continuous medium.

Supply part 70 feeds continuous medium S from first roll 71 in a state where a predetermined tension is applied to the continuous medium, and collection part 80 takes up continuous medium S around second roll 81 in a state where a predetermined tension is applied. Thus, continuous medium S is conveyed. In this way, image-forming-apparatus main part 100 forms an image on continuous medium S conveyed in a state where a tension is applied to the continuous medium.

Meanwhile, in the conventional image forming apparatus, as described above, a predetermined tension cannot be applied to the continuous medium at the time of roll replacement, and therefore, the configuration related to image formation, for example, a fixing part or the like, is brought into a stopped state. Since the configuration related to the image formation is brought into the stopped state, a preliminary operation such as warm-up for stabilizing the configuration related to the image formation is required after the roll replacement. The preliminary operation requires a long waiting time before completion of the preliminary operation, and when the preliminary operation is performed after the roll replacement, the downtime of the apparatus becomes longer. Therefore, it is demanded that the preliminary operation can be performed without stopping the configuration related to image formation at the time of roll replacement, and the downtime of the apparatus is reduced.

Therefore, in the present embodiment, image forming apparatus 1 includes tension maintaining parts 701 and 801 that maintain the tension of continuous medium S in image-forming-apparatus main part 100 at the time of a manipulation for replacing at least one of first roll 71 and second roll 81. The manipulation for replacing at least one of first roll 71 and second roll 81 is, for example, an operation for transitioning to the roll replacement state described below. Tension maintaining parts 701 and 801 include at least a tension applying part and a holding part which will be described below. Further, tension maintaining parts 701 and 801 may further include a tension adjustment part described below.

Although the details will be described below, in the present embodiment, tension applying part 72 of supply part 70 and tension applying part 82 of collection part 80 are used as tension applying parts. As the holding part, holding part 751 (first clamp 75*a* and table 75*c*) in splice table 75 of supply part 70 is used. As the holding part, holding part 851 (first nip roller 85*a* and second nip roller 85*b*) in nip rollers 85 of collection part 80 is used. As the tension adjustment part, tension adjustment part 73 of supply part 70 and tension adjustment part 83 of collection part 80 are used.

Configuration and Operation of Supply Part and Collection Part

The configuration and operation of supply part 70 and collection part 80 will be described with reference to FIG. 1 to FIG. 4.

As described above, supply part 70 includes first roll 71, tension applying part 72, tension adjustment part 73, tension detection part 74, splice table 75, driven roller 76, and the like. Supply part 70 is configured to feed continuous medium S wound around first roll 71, in a state where a predetermined tension is applied to the continuous medium, to supply continuous medium S to image-forming-apparatus main part 100.

Further, collection part 80 includes second roll 81, tension applying part 82, tension adjustment part 83, tension detection part 84, nip rollers 85, and the like. Collection part 80 is configured to collect continuous medium S by taking up, on second roll 81, continuous medium S on which an image is formed in image-forming-apparatus main part 100 and that is discharged from image-forming-apparatus main part 100, in a state where a predetermined tension is applied to the continuous medium.

Tension applying part 72 of supply part 70 and tension applying part 82 of collection part 80 apply a predetermined tension to continuous medium S from opposite end portion sides of continuous medium S.

Although not illustrated, tension applying part 72 of supply part 70 includes a rotation drive shaft, a clutch, a motor, and the like, which are controlled by control part 200. First roll 71 has a roll shape around which continuous medium S is wound and is configured to be attachable to and detachable from the rotation drive shaft.

Figure 2:
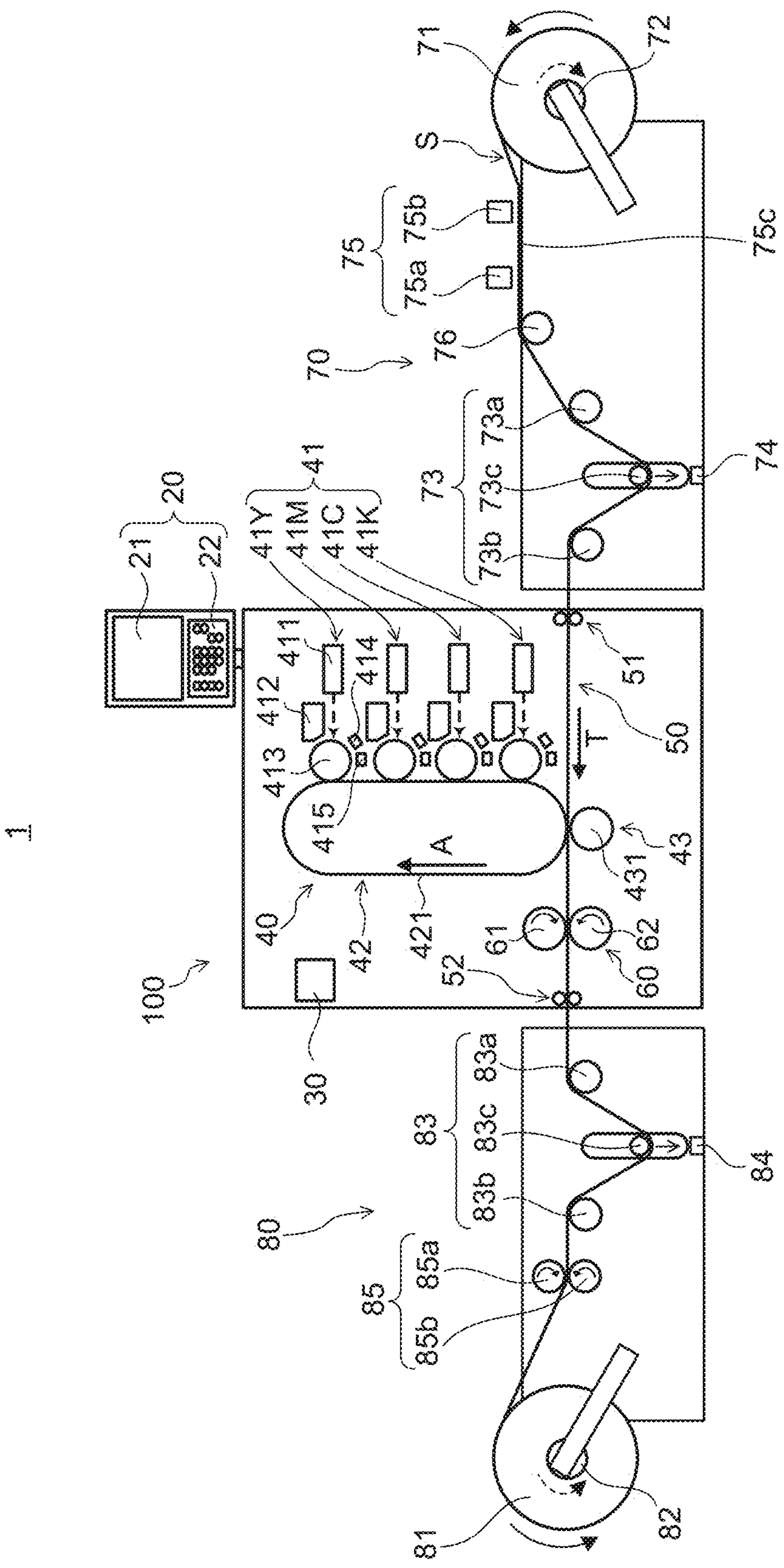
FIG. 2 is a diagram illustrating a printing state of the image forming apparatus illustrated in FIG. 1.

The rotation drive shaft holds first roll 71 attached to the outer periphery thereof such that the first roll is rotatable and rotates in a direction in which continuous medium S is pulled (take-up direction) in the printing standby state (see FIG. 1) and the printing state (see FIG. 2). The direction of pulling is a clockwise direction (see dotted arrow) in FIG. 1 and FIG. 2.

The rotation drive shaft is rotationally driven by the motor via the clutch. The clutch transmits or interrupts rotation from the motor to the rotation drive shaft, and is, for example, a powder clutch.

When the torque of the powder clutch is less than a predetermined torque, the powder clutch connects an input side to an output side of the powder clutch and transmits the rotation from the motor to the rotation drive shaft. On the other hand, when the torque of the powder clutch is equal to or higher than the predetermined torque, the powder clutch disconnects the input side from the output side, and the transmission of the rotation from the motor to the rotation drive shaft is interrupted.

The motor rotates in the direction of pulling continuous medium S, and the powder clutch is connected or disconnected depending on whether or not the torque is less than the predetermined torque. Therefore, the motor pulls continuous medium S with the predetermined torque through the powder clutch, and the predetermined tension is applied to continuous medium S.

Tension applying part 82 of collection part 80 has the same configuration as tension applying part 72 of supply part 70, and includes a rotation drive shaft, a clutch, a motor, and the like (not illustrated), which are also controlled by control part 200. Second roll 81 takes up continuous medium S in a roll shape and is configured to be attachable to and detachable from the rotation drive shaft.

The rotation drive shaft holds second roll 81 attached to the outer periphery of the rotation drive shaft such that the second roll is rotatable and rotates in a direction (take-up direction) in which continuous medium S is pulled in the printing standby state and the printing state. The direction of pulling is a counterclockwise direction (see dotted arrow) in FIG. 1 and FIG. 2.

The rotation drive shaft is also rotationally driven by the motor via the powder clutch. With such a configuration, the motor pulls continuous medium S with a predetermined torque through the powder clutch, and a predetermined tension is applied to continuous medium S.

Tension adjustment part 73 of supply part 70 and tension adjustment part 83 of collection part 80 control the tension of continuous medium S to stabilize the tension to the predetermined tension.

At opposite end portions of continuous medium S, the predetermined tension is applied to the continuous medium by tension applying parts 72 and 82 described above. Further, supply part 70, collection part 80, and image-forming-apparatus main part 100 include a plurality of rollers (conveyance rollers 51 and 52, driven roller 76, and the like) that convey and guide continuous medium S. Tension adjustment parts 73 and 83 are disposed to stabilize the tension of continuous medium S to a predetermined tension at positions distant from tension applying parts 72 and 82 (e.g., in section SC including image-forming-apparatus main part 100) also through a large number of rollers.

In conveyance direction T (see FIG. 2), tension adjustment part 73 is disposed on the upstream side of image-forming-apparatus main part 100 and on the downstream of splice table 75 including holding part 751.

Tension adjustment part 73 includes guide rollers 73*a* and 73*b*, dancer roller 73*c*, and the like. Guide rollers 73*a* and 73*b* are disposed respectively on the upstream and downstream sides of dancer roller 73*c* in conveyance direction T. Dancer roller 73*c* has a predetermined weight (own weight or a weight of a predetermined weight) and is configured to be vertically movable within a predetermined movable range.

Guide rollers 73*a* and 73*b* make contact with the lower surface of continuous medium S, and dancer roller 73*c* disposed between guide roller 73*a* and guide roller 73*b* is configured to make contact with the upper surface of continuous medium S to convey continuous medium S. Therefore, between guide roller 73*a* and guide roller 73*b*, continuous medium S is pulled downward by the weight of dancer roller 73*c*, whereby the tension of continuous medium S can be stabilized to a predetermined tension.

Tension adjustment part 83 is disposed on the downstream side of image-forming-apparatus main part 100 in conveyance direction T and is disposed on the upstream side of nip rollers 85 having holding part 851.

Similarly to tension adjustment part 73, tension adjustment part 83 also includes guide rollers 83*a* and 83*b*, dancer roller 83*c*, and the like, and the tension of continuous medium S can be stabilized to a predetermined tension by the same configuration as tension adjustment part 73.

As described above, since tension adjustment parts 73 and 83 are disposed on the upstream side and the downstream side of image-forming-apparatus main part 100, respectively, in conveyance direction T, the tension of continuous medium S can be stabilized to a predetermined tension in section SC between tension adjustment part 73 and tension adjustment part 83.

Tension adjustment parts 73 and 83 are provided respectively with tension detection parts 74 and 84 that detect the tension of continuous medium S. Tension detection parts 74 and 84 are, for example, proximity sensors, and are disposed in the vicinities of the lowermost portions of the movable ranges of dancer rollers 73*c* and 83*c*.

When the tension of continuous medium S is loosened or lost, the weight of dancer rollers 73*c* and 83*c* causes dancer rollers 73*c* and 83*c* to move downward. The proximity sensors detect that the tension of continuous medium S is low (abnormal tension) by detecting dancer rollers 73*c* and 83*c* having moved to the vicinities of the lowermost portions of the movable ranges.

Further, as tension detection parts 74 and 84, the proximity sensors may be disposed in the vicinities of the uppermost portions of the movable ranges of dancer rollers 73*c* and 83*c*. In this case, when the tension of continuous medium S becomes higher than a predetermined tension due to a trouble or the like, dancer rollers 73*c* and 83*c* move upward due to the tension. The proximity sensors detect dancer rollers 73*c* and 83*c* having moved to the vicinities of the uppermost portions of the movable ranges, thereby detecting that the tension of continuous medium S is high (abnormal tension).

In the case of such a tension abnormality, for example, control part 200 stops the conveyance of continuous medium S itself and notifies a user of an error message of the tension abnormality (tension decrease, tension excess, or the like). In addition, control part 200 may terminate the operation of maintaining the tension of continuous medium S.

Here, although the proximity sensors are described as an example as tension detection parts 74 and 84, any sensor can be used as long as it is a sensor that detects the tension (or the physical quantity correlated with the tension) of continuous medium S. For example, tension detection parts 74 and 84 may be those sensors that detect the tension based on the positions of the vertical movements of dancer rollers 73*c* and 83*c*.

Splice table 75 of supply part 70 is used for cutting continuous medium S and connecting continuous media S to each other during replacement of first roll 71. Splice table 75 includes first clamp 75*a*, second clamp 75*b*, table 75*c*, and the like.

The operation of first clamp 75*a* and second clamp 75*b* will be described with reference to the roll replacement state illustrated in FIG. 3, which will be described later. Each of the clamps is configured to be vertically movable under the control of control part 200. For example, except when splice table 75 is in use, first clamp 75*a* and second clamp 75*b* are moved to an upper position and are spaced upward from table 75*c* (see, e.g., FIG. 1).

In use of splice table 75, one or both of first clamp 75*a* and second clamp 75*b* are moved to a lower position to hold continuous medium S on table 75*c*. Thus, first clamp 75*a* and second clamp 75*b* clamp continuous medium S between them and table 75*c* to hold continuous medium S (see, for example, FIG. 3).

In the present embodiment, as described later with reference to FIG. 3, first clamp 75*a* and table 75*c* of splice table 75 are used as holding part 751. During the replacement of first roll 71, holding part 751 (first clamp 75*a* and table 75*c*) holds continuous medium S so as to maintain the tension of continuous medium S in image-forming-apparatus main part 100. At this time, holding part 751 holds continuous medium S in a state where a predetermined tension is applied to continuous medium S.

Nip rollers 85 of collection part 80 are used to convey continuous medium S. Nip rollers 85 include first nip roller 85*a*, second nip roller 85*b*, and the like.

The operations of first nip roller 85*a* and second nip roller 85*b* will be described later with reference to FIG. 1 to FIG. 4, and each of them is configured to be vertically movable under the control of control part 200. Further, under the control of control part 200, at least one of first nip roller 85*a* and second nip roller 85*b* is rotationally driven to convey continuous medium S in conveyance direction T (see FIG. 2).

Figure 3:
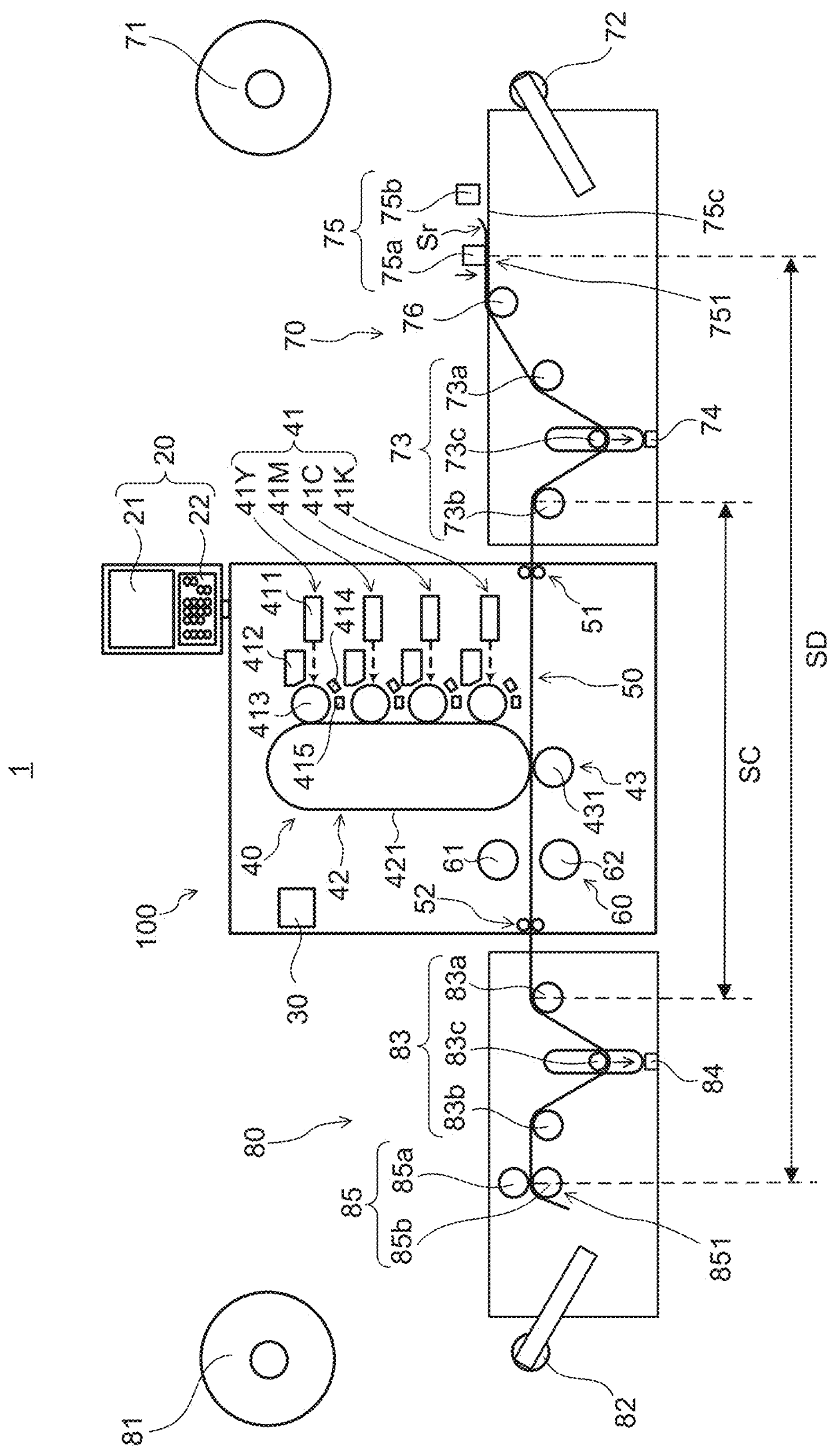
FIG. 3 is a diagram illustrating a roll replacement state of the image forming apparatus illustrated in FIG. 1.

For example, first nip roller 85*a* is moved downward and second nip roller 85*b* is moved upward to nip continuous medium S therebetween (see FIG. 1 and FIG. 3). Further, while continuous medium S is nipped between first nip roller 85*a* and second nip roller 85*b*, first nip roller 85*a* and second nip roller 85*b* are rotationally driven to convey continuous medium S (FIG. 2). In addition, first nip roller 85*a* is moved upward and second nip roller 85*b* is moved downward to separate them from continuous medium S (see FIG. 4).

In the present embodiment, as described later with reference to FIG. 3, first nip roller 85*a* and second nip roller 85*b* of nip rollers 85 are used as holding part 851. During the replacement of second roll 81, holding part 851 (first nip roller 85*a* and second nip roller 85*b*) holds continuous medium S so as to maintain the tension of continuous medium S in image-forming-apparatus main part 100. At this time, holding part 851 holds continuous medium S in a state where a predetermined tension is applied to continuous medium S.

Apparatus State of Image Forming Apparatus

Next, the printing standby state, printing state, roll replacement state, and steady state of image forming apparatus 1 will be described with reference to FIG. 1 to FIG. 4.

Printing Standby State

FIG. 1 is a diagram illustrating the printing standby state of image forming apparatus 1. The printing standby state (the image formable state in the present invention) is a state in which the image formation (printing) on continuous medium S can be started in image forming apparatus 1, and when an instruction from the user (a printing instruction illustrated in FIG. 6 to be described later) is received, the image formation (printing) on continuous medium S is started.

In the printing standby state, when an instruction is given from control part 200, image forming part 40 can perform a preliminary operation such as operation check for stabilizing the configuration related to image formation. Further, fixing roller 61 and pressurizing roller 62 of fixing part 60 are in a state of being separated from each other and separated from continuous medium S, and when an instruction is given from control part 200, continuous medium S can be nipped, and the preliminary operation such as warm-up for stabilizing the fixing and pressurizing rollers can be performed.

Further, in the printing standby state, first clamp 75*a* and second clamp 75*b* of splice table 75 are spaced upward from table 75*c*. That is, continuous medium S is not held between first clamp 75*a* and second clamp 75*b* and table 75*c*.

Further, in the printing standby state, continuous medium S is held between first nip roller 85*a* and second nip roller 85*b*, that is, by holding part 851, but nip rollers 85 are not rotationally driven and continuous medium S is not conveyed.

Further, in the printing standby state, the output side of the powder clutch, the rotation drive shaft, and first roll 71 are not rotating, but the motor and the input side of the powder clutch of tension applying part 72 are rotating in the direction of pulling continuous medium S. Therefore, the output side of the powder clutch, the rotation drive shaft, and first roll 71 are in a state of being pulled at a predetermined torque by the rotation of the motor and the input side of the powder clutch of tension applying part 72. As a result, tension applying part 72 applies a predetermined tension to continuous medium S from the upstream end portion in conveyance direction T in section SA between first roll 71 and nip rollers 85.

Further, in the printing standby state, the output side of the powder clutch, the rotation drive shaft, and second roll 81 are not rotating, but the motor and the input side of the powder clutch of tension applying part 82 are also rotating in the direction of pulling continuous medium S. Therefore, the output side of the powder clutch, the rotation drive shaft, and second roll 81 are in a state of being pulled at a predetermined torque by the rotation of the motor and the input side of the powder clutch of tension applying part 82. Accordingly, tension applying part 82 applies a predetermined tension to continuous medium S from the downstream end portion in conveyance direction T in section SB between nip rollers 85 and second roll 81.

As described above, in the printing standby state, in above-described section SA, tension applying part 72 applies a predetermined tension to continuous medium S. In above-described section SA, tension adjustment part 73 and tension adjustment part 83 stabilize the tension of continuous medium S to a predetermined tension, and stabilize the tension of continuous medium S to a predetermined tension also in above-described section SC.

Here, the preliminary operation will be described. As described above, image-forming-apparatus main part 100 includes developing devices 412 (developing parts in the present invention), photoconductor drums 413, intermediate transfer belt 421 (transfer part in the present invention), fixing part 60, and the like.

In developing devices 412, as the preliminary operation, concentration adjustment and color misregistration adjustment (calibration) of an image (toner image) to be developed on photoconductor drums 413 are performed.

Further, as the preliminary operation, photoconductor drums 413 perform image adjustment of the image (toner image) to be transferred to intermediate transfer belt 421, and intermediate transfer belt 421 performs image adjustment of the image (toner image) to be transferred to continuous medium S, as the preliminary operation.

In the above-described calibration and image adjustment, developing devices 412 develop the toner image on photoconductor drums 413, photoconductor drums 413 transfer the developed toner image to intermediate transfer belt 421, and the transferred toner image is read by an image reader (not illustrated).

In addition, fixing part 60 raises the temperature (warm-up) to a predetermined temperature as the preliminary operation in order to fix the image (toner image) transferred to continuous medium S.

When the tension of continuous medium S is loosened during the preliminary operation described above, continuous medium S may be wound around driving parts such as intermediate transfer belt 421, fixing roller 61, and pressurizing roller 62, and thus the preliminary operation may be incorrectly performed, or malfunction may be caused in the above-described driving parts. Therefore, in the above-described preliminary operation, the tension of continuous medium S needs to be maintained.

Accordingly, in the present embodiment, holding parts 751 and 851 also hold tensioned continuous medium S not only in the printing standby state and the printing state but also during below-described roll replacement. Therefore, even in the roll replacement state, the above-described preliminary operation can be performed, and downtime of the apparatus can be reduced. In addition, since the above-described preliminary operation can be performed during the roll replacement, for example, the number of preliminary operations performed in the printing state can be reduced, and the efficiency of image formation (printing) can also be improved.

Printing State

FIG. 2 is a diagram illustrating the printing state of image forming apparatus 1. The printing state is a state in which an image is being formed (printed) on continuous medium S in accordance with an instruction from the user (a printing instruction illustrated in FIG. 6).

In the printing state, when an instruction is given from control part 200, image forming part 40 can perform a preliminary operation such as operation check. Further, fixing roller 61 and pressurizing roller 62 of fixing part 60 are in a state of nipping continuous medium S therebetween and of conveying continuous medium S in conveyance direction T, and the preliminary operation such as warm-up can be performed when the instruction is given from control part 200.

Further, in the printing state, first clamp 75*a* and second clamp 75*b* of splice table 75 are spaced upward from table 75*c*, and continuous medium S is not held between the clamps and table 75*c*.

In the printing state, nip rollers 85 nip continuous medium S and are rotationally driven in conjunction with the image formation in image-forming-apparatus main part 100, and continuous medium S is conveyed.

Further, in the printing state, the motor and the input side of the powder clutch of tension applying part 72 rotate in the direction of pulling continuous medium S. Further, the output side of the powder clutch and the rotation drive shaft of tension applying part 72, and first roll 71 are rotated in the direction opposite to the rotation direction of the motor and the input side of the powder clutch of tension applying part 72 by the conveyance of continuous medium S by the rotation drive of nip rollers 85. When the tension of continuous medium S decreases and the torque of the powder clutch of tension applying part 72 becomes less than a predetermined torque during the conveyance of continuous medium S, the powder clutch is brought into the connected state and continuous medium S is pulled by the predetermined torque. Thus, tension applying part 72 applies the predetermined tension to continuous medium S.

Further, in the printing state, the motor and the input side of the powder clutch of tension applying part 82 rotate in the direction of pulling continuous medium S. In addition, the output side of the powder clutch and the rotation drive shaft of tension applying part 82, and second roll 81 rotate in the same direction as the rotation direction of the motor and the input side of the powder clutch of tension applying part 82 in conjunction with the conveyance of continuous medium S by the rotation drive of nip rollers 85. When the tension of continuous medium S decreases and the torque of the powder clutch of tension applying part 82 becomes less than a predetermined torque during the conveyance of continuous medium S, the powder clutch is brought into the connected state and continuous medium S is pulled at the predetermined torque. Thus, tension applying part 82 applies the predetermined tension to continuous medium S.

In the printing state, tension adjustment part 73 and tension adjustment part 83 stabilize the tension of conveyed continuous medium S to a predetermined tension. As a result, the tension of continuous medium S is stabilized via the plurality of rollers to a predetermined tension in section SC (see FIG. 1) distant from tension applying part 72 and tension applying part 82.

In a case where the tension of continuous medium S is loosened or lost due to a trouble or the like in the printing state, tension detection parts 74 and 84 detect that the tension of continuous medium S is lower than a predetermined tension. Then, control part 200 notifies the user of an error message such as that of a decrease in tension and/or prohibits the preliminary operation or the conveyance of continuous medium S based on the detection results of tension detection parts 74 and 84.

Roll Replacement State

FIG. 3 is a diagram illustrating the roll replacement state of image forming apparatus 1. The roll replacement state is a state in which the roll replacement can be performed in accordance with an instruction from the user ("Roll Replacement ON" illustrated in FIG. 6 to be described later).

In the roll replacement state, when an instruction is given from control part 200, image forming part 40 can perform a preliminary operation such as operation check. Further, fixing roller 61 and pressurizing roller 62 of fixing part 60 are in a state of being separated from each other and separated from continuous medium S, and when an instruction is given from control part 200, a preliminary operation such as warm-up can be performed. As described below, since the tension of continuous medium S in image-forming-apparatus main part 100 is maintained also in the roll replacement state, the above-described preliminary operation can be performed. Further, since the tension of continuous medium S in image-forming-apparatus main part 100 is maintained in the roll replacement state, the preliminary operation may be performed while the tension is maintained.

In the roll replacement state, first clamp 75*a* of splice table 75 is moved downward, and continuous medium S (cut continuous medium Sr) is held by holding part 751, that is, between first clamp 75*a* and table 75*c*.

In supply part 70, holding part 751 holds tensioned continuous medium S, thereby holding continuous medium S so as to maintain a predetermined tension.

Second clamp 75*b* of splice table 75 is spaced upward from table 75*c*, but as will be described later, when continuous media S are to be connected to each other, the second clamp is moved downward, and new continuous media S is held between second clamp 75*b* and table 75*c*.

Further, in the roll replacement state, nip rollers 85 are not rotationally driven, and continuous medium S is not conveyed, but continuous medium S (cut continuous medium Sr) is held by holding part 851 (between first nip roller 85*a* and second nip roller 85*b*).

In collection part 80, holding part 851 holds tensioned continuous medium S, thereby holding continuous medium S so as to maintain a predetermined tension.

In the case where both of first roll 71 and second roll 81 are replaced, continuous medium S is held by holding part 751 and holding part 851 before continuous medium S is cut, and continuous medium S is held by these parts such that a predetermined tension is maintained. Further, even after continuous medium S is cut, opposite end portions of continuous medium Sr are held by holding parts 751 and 851, respectively, and a predetermined tension is maintained in continuous medium Sr.

When only first roll 71 is replaced, continuous medium S may be held by holding part 751 described above, and holding part 851 may hold continuous medium S or does not have to hold continuous medium S. When continuous medium S is not held by holding part 851, the rotation of the motor of tension applying part 82 is not stopped, and tension applying part 82 applies a predetermined tension to continuous medium S from the downstream end portion in conveyance direction T.

When only second roll 81 is replaced, continuous medium S may be held by holding part 851 described above, and holding part 751 may hold continuous medium S or does not have to hold continuous medium S. When continuous medium S is not held by holding part 751, the rotation of the motor of tension applying part 72 is not stopped, and tension applying part 72 applies a predetermined tension to continuous medium S from the upstream end portion in conveyance direction T.

When only one or both of first roll 71 and second roll 81 is replaced, tension adjustment part 73 and tension adjustment part 83 stabilize the tension of continuous medium S to a predetermined tension in section SD between holding part 751 and holding part 851 in either case. Therefore, also in section SC, tension adjustment part 73 and tension adjustment part 83 stabilize the tension of continuous medium S to a predetermined tension.

When first roll 71 is replaced, the rotation of the motor of tension applying part 72 is stopped, and no tension is applied to continuous medium S between holding part 751 and first roll 71. By cutting continuous medium S between holding part 751 and first roll 71, first roll 71 can be detached from the rotation drive shaft of tension applying part 72, and new first roll 71 can be attached to the rotation drive shaft.

Similarly, when second roll 81 is replaced, the rotation of the motor of tension applying part 82 is stopped, and no tension is applied to continuous medium S between holding part 851 and second roll 81. By cutting continuous medium S between holding part 851 and second roll 81, second roll 81 can be detached from the rotation drive shaft of tension applying part 82, and new second roll 81 can be attached to the rotation drive shaft.

In a case where the tension of continuous medium S is loosened or lost due to a trouble or the like in the roll replacement state, tension detection parts 74 and 84 detect that the tension of continuous medium S is lower than a predetermined tension. Control part 200 notifies the user of an error message such as that of a decrease in tension and/or prohibits the preliminary operation based on the detection results of tension detection parts 74 and 84. In this case, control part 200 transitions from the roll replacement state to the steady state, as described later with reference to FIG. 6.

A procedure for the roll replacement will be described later with reference to FIG. 7 to FIG. 14, and the cutting of continuous medium S and the connection between continuous media S using splice table 75 of supply part 70 in the roll replacement state will be described below.

When first roll 71 is replaced in the roll replacement state described above, first, continuous medium S is cut using splice table 75 as described below.

Figure 8:
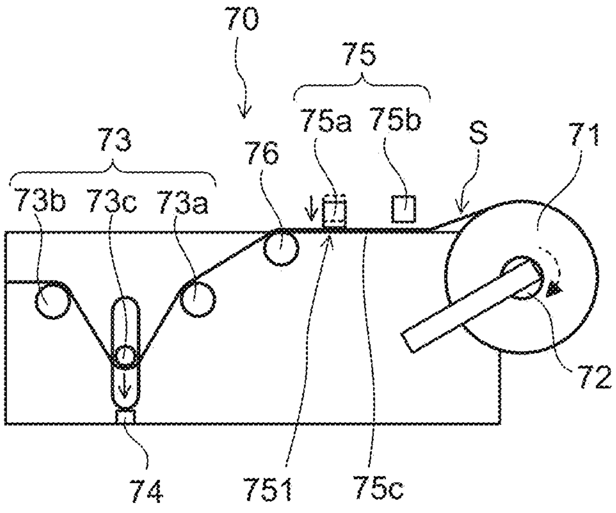
FIG. 8 is a diagram illustrating a supply part of the image forming apparatus in a case where the continuous medium is held by a holding part in the order according to the flowchart illustrated in FIG. 7.
Figure 9:
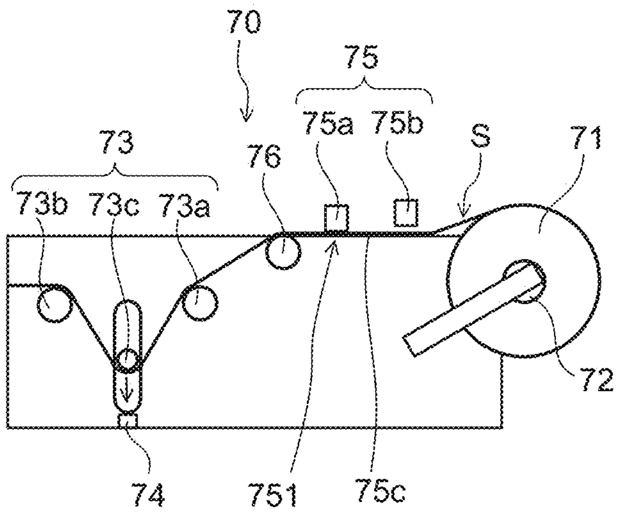
FIG. 9 is a diagram illustrating the supply part of the image forming apparatus in a case where the rotation of a motor of a tension applying part is stopped in the order according to the flowchart illustrated in FIG. 7.

In the roll replacement state, as described in FIG. 8 and FIG. 9, first clamp 75*a* of splice table 75 is lowered and continuous medium S is nipped between first clamp 75*a* and table 75*c*, so that holding part 751 holds continuous medium S (see FIG. 8). Thereafter, the rotation of the motor of tension applying part 72 is stopped (see FIG. 9). Second clamp 75*b* of splice table 75 remains spaced upward from table 75*c*.

Then, on table 75*c* between first clamp 75*a* and second clamp 75*b*, continuous medium S is cut by a cutter or the like (not illustrated) in the region between the first clamp and the second clamp.

After continuous medium S is cut, cut continuous medium Sr on the first clamp 75*a* side remains held by holding part 751 (between first clamp 75*c* and the table). On the other hand, since continuous medium S on the second clamp 75*b* side is not held by second clamp 75*b* and the like, first roll 71 can be detached from the rotation drive shaft.

Figure 6:
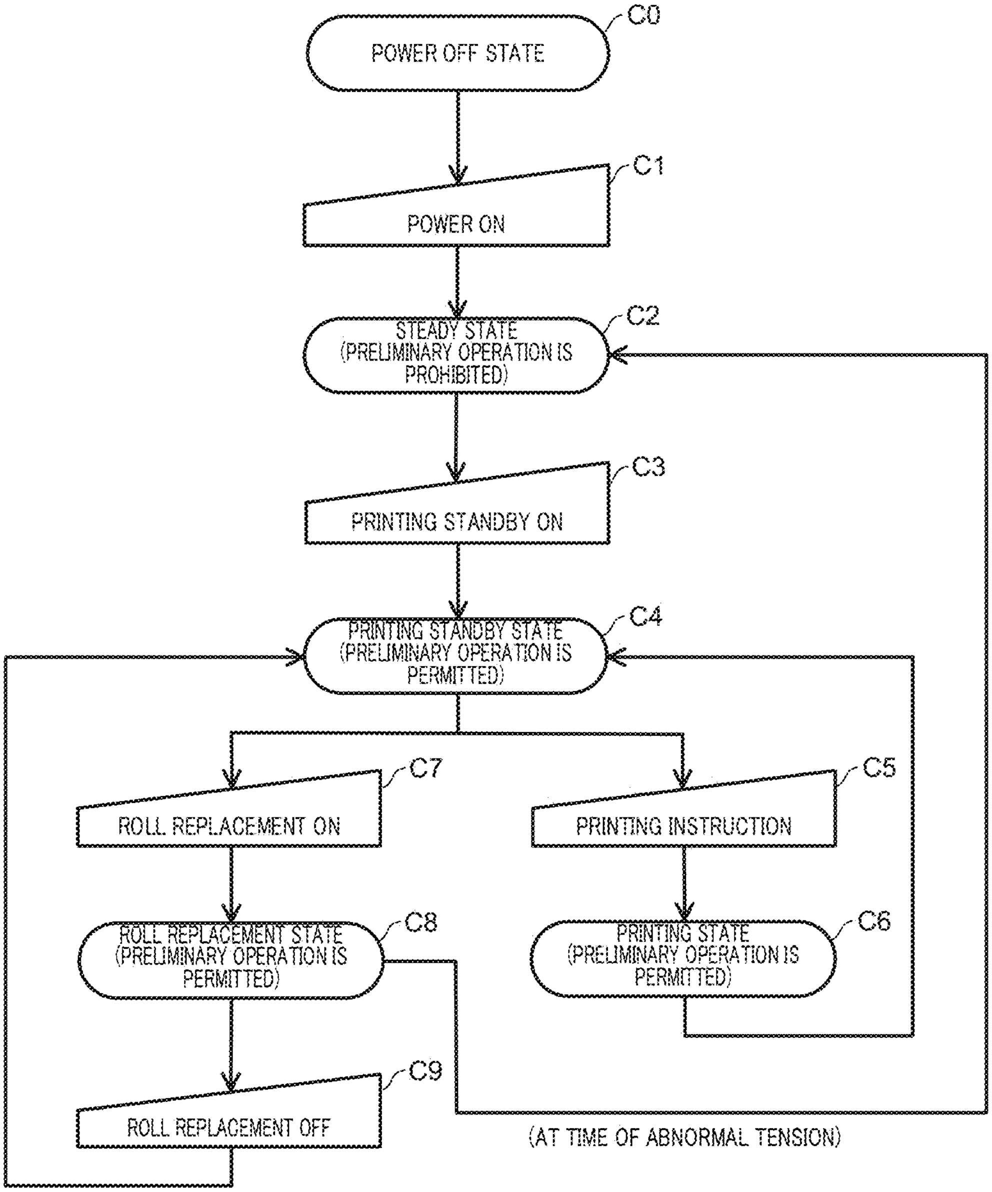
FIG. 6 is an explanatory view for explaining a transition to each apparatus state of the image forming apparatus illustrated in FIG. 1.

In the above-described procedure of cutting continuous medium S, when the user selects "Roll Replacement ON" described later with reference to FIG. 6, control part 200 automatically controls the procedure entirely or partially.

When continuous media S are to be connected to each other by using splice table 75 after continuous medium S is cut as described above, new first roll 71 is attached to the rotation drive shaft. Next, a leading end portion of continuous medium Sn (see FIG. 12) of new first roll 71 is passed between second clamp 75*b* and table 75*c*. Next, on table 75*c* between first clamp 75*a* and second clamp 75*b*, the end portions of cut continuous medium Sr and continuous medium Sn of new first roll 71 are placed on each other.

Next, second clamp 75*b* is lowered downward, and continuous medium Sn of new first roll 71 is nipped between second clamp 75*b* and table 75*c* such that continuous medium Sn is held. At this time, cut continuous medium Sr is held by holding part 751 (between first clamp 75*a* and table 75*c*).

Next, on table 75*c* between first clamp 75*a* and second clamp 75*b*, two overlapping continuous media Sr and Sn in the region between the first and the second clamps are cut and cut continuous media Sr and Sn are connected to each other by an adhesive member such as adhesive tape Ta. Next, the motor of tension applying part 72 is rotated to apply tension to connected continuous medium Sn (see FIG. 12 to be described later).

Figure 13:
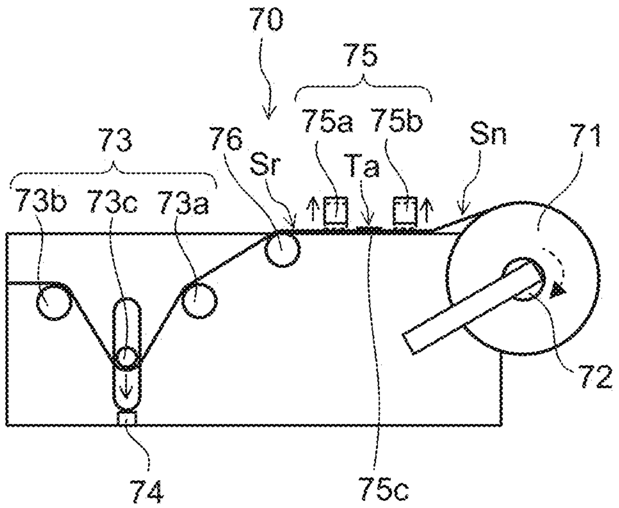
FIG. 13 is a diagram illustrating the supply part of the image forming apparatus in the case where the holding of the continuous medium by the holding part is released in the order according to the flowchart illustrated in FIG. 11.

Next, first clamp 75*a* and second clamp 75*b* are raised upward and separated from table 75*c* (see FIG. 13 described later). Since cut continuous medium Sr is connected to continuous medium Sn of new first roll 71, these continuous media Sr and Sn are united into single continuous medium S. The tension is applied by tension applying part 72 to continuous medium Sn. Accordingly, the replacement of first roll 71 ends while the tension of one-piece continuous medium S (continuous media Sr and Sn) is maintained.

Control part 200 also automatically controls the above-described procedure of connection between continuous media S entirely or partially.

Note here that, the cutting of continuous medium S and the connection of continuous medium S using splice table 75 of supply part 70 have been described, but the same configuration may be provided in collection part 80 to cut continuous medium S and connect continuous media S to each other.

Steady State

Figure 4:
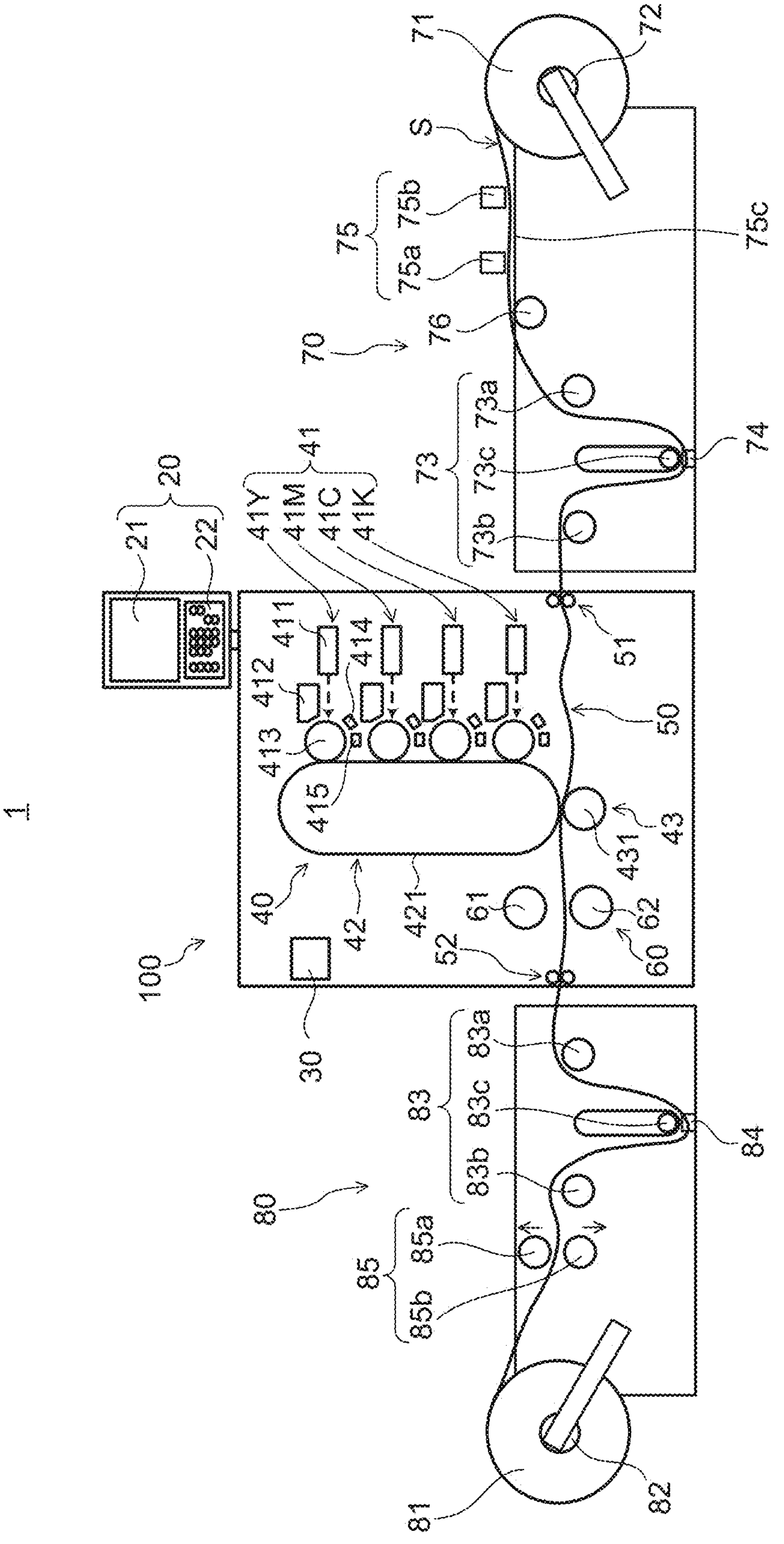
FIG. 4 is a diagram illustrating a steady state of the image forming apparatus illustrated in FIG. 1.
Figure 5:
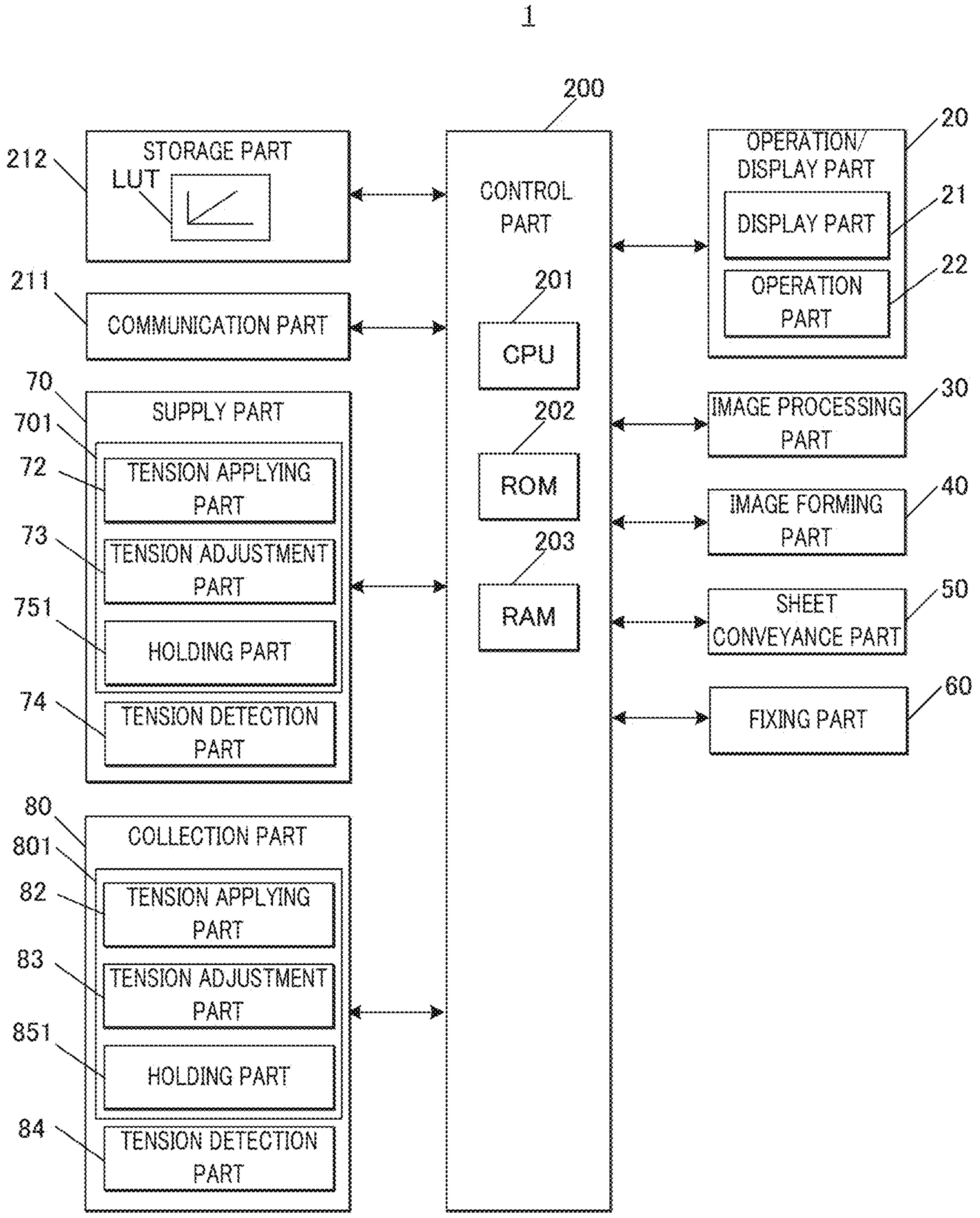
FIG. 5 is a block diagram illustrating a principal part of a control system of the image forming apparatus illustrated in FIG. 1.

FIG. 4 is a diagram illustrating the steady state of image forming apparatus 1. The steady state is a state in which, if there is an instruction from the user ("Printing Standby ON" instruction illustrated in FIG. 6 to be described later), the image forming apparatus transitions to the printing standby state and is a state before the tension is applied to continuous medium S as described below.

Since the steady state is a state before the tension is applied to continuous medium S, the preliminary operation cannot be performed. Therefore, in the steady state, image forming part 40 cannot perform the preliminary operation such as operation check. Further, fixing roller 61 and pressurizing roller 62 of fixing part 60 are separated from each other and separated from continuous medium S. Continuous medium S is not held between the fixing roller and the pressurizing roller, and the preliminary operation such as warm-up cannot be performed.

Further, in the steady state, first clamp 75*a* and second clamp 75*b* of splice table 75 are spaced upward from table 75*c*, and continuous medium S is not held between the first and the second clamps and table 75*c*. That is, holding part 751 does not hold continuous medium S.

In addition, in the steady state, first nip roller 85*a* and second nip roller 85*b* of nip rollers 85 are separated from each other and separated from continuous medium S. Continuous medium S is not held between the first and the second nip rollers, and continuous medium S is not conveyed. That is, holding part 851 does not hold continuous medium S.

In addition, in the steady state, the motor and the input side of the powder clutch of tension applying part 72 does not rotate. Therefore, tension applying part 72 is not applying a predetermined tension to continuous medium S. Further, since continuous medium S is not conveyed by nip rollers 85, the output side of the powder clutch and the rotation drive shaft of tension applying part 72, and first roll 71 are also not rotated.

In addition, in the steady state, the motor and the input side of the powder clutch of tension applying part 82 are also not rotated. Therefore, tension applying part 82 is not applying a predetermined tension to continuous medium S. Further, since continuous medium S is not conveyed by nip rollers 85, the output side of the powder clutch and the rotation drive shaft of tension applying part 82, and second roll 81 are also not rotated.

As described above, in the steady state, continuous medium S is not held by holding parts 751 and 851, and no tension is applied by tension applying parts 72 and 82. Therefore, in tension adjustment part 73 and tension adjustment part 83, dancer rollers 73*c* and 83*c* moves downward due to the weight of dancer rollers 73*c* and 83*c*, and accordingly, corresponding portions of continuous medium S droop downward.

In this state, tension detection parts 74 and 84 detect that the tension of continuous medium S is lower than a predetermined tension. Control part 200 notifies the user of an error message such as that of a decrease in tension based on the detection results of tension detection parts 74 and 84, and/or prohibits the above-described preliminary operation and conveyance of continuous medium S.

Transition of Apparatus State

As described above, image forming apparatus 1 according to the present embodiment has, as the apparatus state, the printing standby state, the printing state, the roll replacement state, the steady state, and the like, and transitions the apparatus state in accordance with an instruction from a user and/or the apparatus state. FIG. 6 is an explanatory view for explaining the transition to each apparatus state in image forming apparatus 1.

When the initial state of image forming apparatus 1 is power OFF state C0, and when the user gives an instruction of power ON C1 to image forming apparatus 1, image forming apparatus 1 transitions to above-described steady state C2. In this steady state C2, as described above, the preliminary operation is prohibited since continuous medium S is in a state prior to the application of tension.

In steady state C2, when continuous medium S is set in image forming apparatus 1 and a tension can be applied to continuous medium S, the user gives an instruction of printing standby ON C3 to image forming apparatus 1 and accordingly image forming apparatus 1 transitions to above-described printing standby state C4. In printing standby state C4, as described above, the preliminary operation is permitted since tension is applied to continuous medium S.

In printing standby state C4, when the user gives printing instruction C5 to image forming apparatus 1, image forming apparatus 1 transitions to above-described printing state C6 and executes printing. As described above, since tension is applied to continuous medium S also in this printing state C6, the preliminary operation is permitted. After the printing is completed, image forming apparatus 1 transitions (returns) to printing standby state C4 described above.

Further, in printing standby state C4, when the user gives an instruction of roll replacement ON C7 to image forming apparatus 1, image forming apparatus 1 transitions to roll replacement state C8 described above. In roll replacement state C8, the user performs roll replacement of at least one of first roll 71 and second roll 81. Since tension is applied to continuous medium S also in this roll replacement state C8 as described above, the preliminary operation is permitted. The transition from printing standby state C4 to roll replacement state C8 will be described later with reference to FIG. 7 to FIG. 10.

After the roll replacement, when the user gives an instruction of roll replacement OFF C9 to image forming apparatus 1, image forming apparatus 1 transitions (returns) to printing standby state C4 described above. The transition from roll replacement state C8 to printing standby state C4 will be described later with reference to FIG. 11 to FIG. 14.

When the tension applied to continuous medium S is loosened or lost during the roll replacement, and when tension detection parts 74 and 84 detect that the tension of continuous medium S is lower than a predetermined tension (abnormal tension), image forming apparatus 1 transitions to above-described steady state C2. The transition from roll replacement state C8 to steady state C2 will be described later with reference to FIG. 15.

In this case, when the tension of continuous medium S is lower than the predetermined tension, it is detected that the tension is abnormal, and the process transitions to above-described steady state C2. Also, when the tension of continuous medium S is higher than the predetermined tension, it may be detected that the tension is abnormal, and the process may transition to above-described steady state C2.

In this case, as described above, the proximity sensors are disposed in the vicinities of the uppermost portions of the movable ranges of dancer rollers 73*c* and 83*c*. When dancer rollers 73*c* and 83*c* are close to the proximity sensors, it is detected that the tension of continuous medium S is higher than the predetermined tension. Further, when the abnormal tension of continuous medium S is detected in above-described printing state C6, that is, during printing, the transition to above-described steady state C2 may be made.

Transition from Printing Standby State to Roll Replacement State

The above-described transition from printing standby state C4 to roll replacement state C8 will be described later also with reference to FIG. 7 to FIG. 10.

Figure 7:
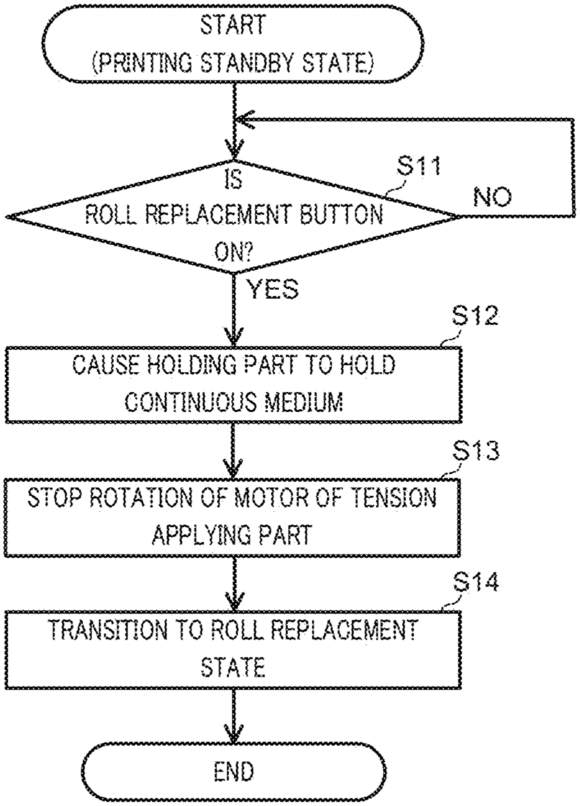
FIG. 7 is a flowchart illustrating a transition from the printing standby state to the roll replacement state in the image forming apparatus illustrated in FIG. 1.
Figure 10:
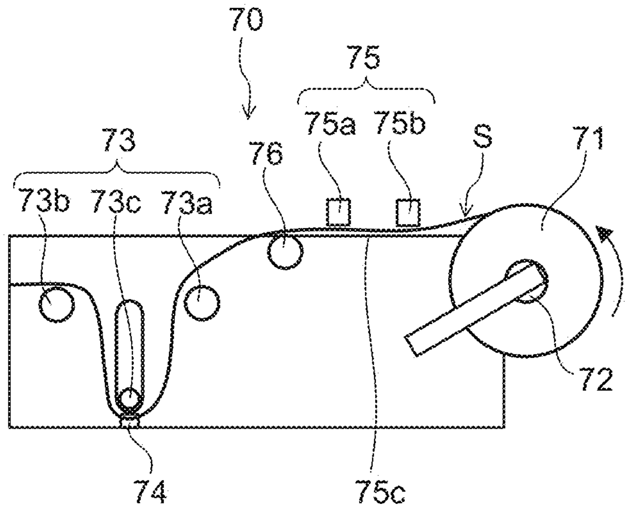
FIG. 10 is a diagram illustrating the supply part of the image forming apparatus in a case where processing is performed in a different order from the flowchart illustrated in FIG. 7.

FIG. 7 is a flowchart for explaining the transition from printing standby state C4 to roll replacement state C8 in image forming apparatus 1. FIG. 8 is a diagram illustrating supply part 70 of image forming apparatus 1 in the case where continuous medium S is held by holding part 751 in the order according to the flowchart illustrated in FIG. 7. FIG. 9 is a diagram illustrating supply part 70 of image forming apparatus 1 in the case where the rotation of the motor of tension applying part 72 is stopped in the order according to the flowchart illustrated in FIG. 7. FIG. 10 is a diagram illustrating supply part 70 of image forming apparatus 1 in the case where the processing is performed in a different order from the flowchart illustrated in FIG. 7.

Here, supply part 70 will be described as an example, and it is assumed that continuous medium S is held by holding part 851 at the side of collection part 80, for example.

(Step S11)

In the printing standby state, control part 200 checks whether or not a roll replacement button is on. When the roll replacement button is on (YES), the process proceeds to step S12, and when the roll replacement button is not on (NO), step S11 is repeated. Although not illustrated here, for example, control part 200 checks whether or not a printing instruction button is on, and when the printing instruction button is on, transition to printing state C5 is made as described with reference to FIG. 6, and printing is performed.

(Step S12)

Control part 200 moves first clamp 75*a* of splice table 75 downward to cause holding part 751 (first clamp 75*a* and table 75*c*) to hold continuous medium S. At this time, the motor of tension applying part 72 keeps rotating, and a predetermined tension is applied to continuous medium S by pulling continuous medium S with a predetermined torque via the powder clutch (see FIG. 8). Holding part 751 thus holds continuous medium S in a state where a predetermined tension is applied to continuous medium S, and maintains the tension of continuous medium S.

(Step S13)

Control part 200 stops the rotation of the motor of tension applying part 72 (see FIG. 9). That is, the application of tension to continuous medium S is stopped.

As described above, continuous medium S is held by holding part 751 before the rotation of the motor of tension applying part 72 is stopped. Accordingly, in section SD illustrated in FIG. 3, the tension of continuous medium S can be reliably maintained, and the tension of continuous medium S can be maintained even in section SC.

When the order of step S12 and step S13 is reversed, the rotation of the motor of tension applying part 72 is stopped before holding part 751 holds continuous medium S.

In this case, in section SD, the tension applied from tension applying part 72 to continuous medium S is lost. Then, in tension adjustment part 73, dancer roller 73*c* moves downward due to the weight of dancer roller 73*c*, and continuous medium S of the portion droops downward (see FIG. 10). This is the same state as the steady state illustrated in FIG. 4, in which the tension of continuous medium S in section SC is also lost, continuous medium S is not placed along a predetermined conveyance path, and the preliminary operation cannot be executed.

Therefore, in order to maintain the tension of continuous medium S in sections SD and SC, holding part 751 needs to hold continuous medium S before the rotation of the motor of tension applying part 72 is stopped.

(Step S14)

Control part 200 transitions from printing standby state C4 to roll replacement state C8 as the apparatus state.

Here, although supply part 70 has been described as an example, the same procedure is also applied to collection part 80. Repetitive descriptions of the same procedure will be omitted. In this case, it is assumed that continuous medium S is held by holding part 751 at the supply part 70 side, for example.

Transition from Roll Replacement State to Printing Standby State

The transition from roll replacement state C8 to printing standby state C4 described above will be described below with reference also to FIG. 11 to FIG. 14.

Figure 11:
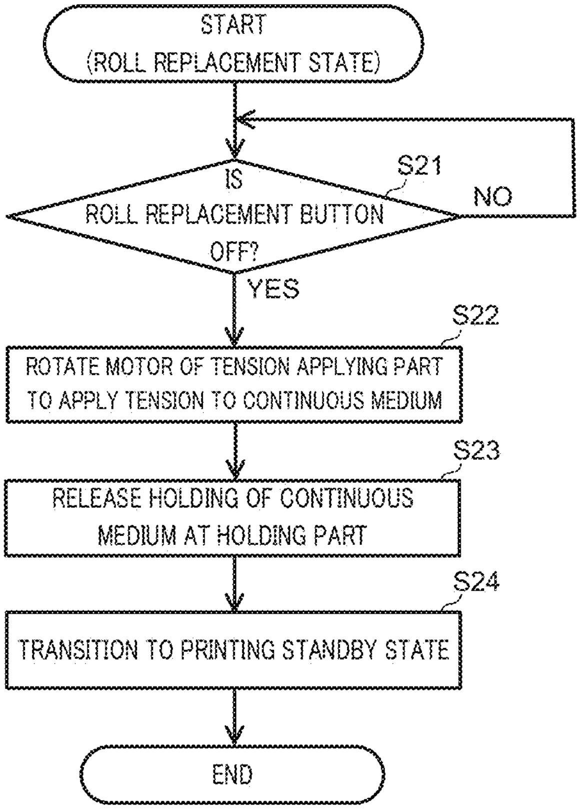
FIG. 11 is a flowchart for explaining a transition from the roll replacement state to the printing standby state in the image forming apparatus illustrated in FIG. 1.
Figure 12:
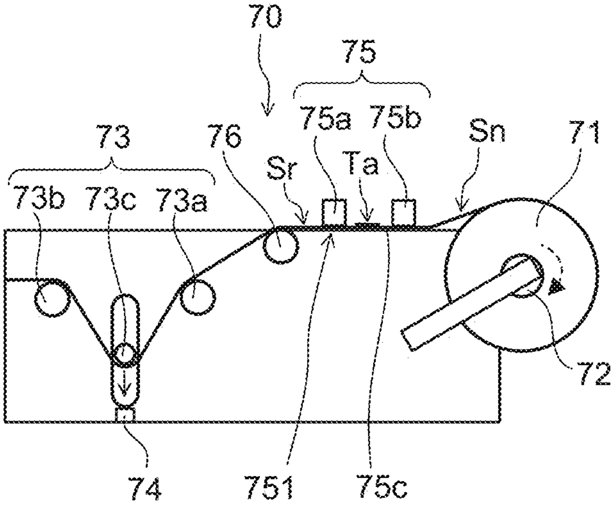
FIG. 12 is a diagram illustrating the supply part of the image forming apparatus in a case where the motor of the tension applying part is rotated and tension is applied to the continuous medium in the order according to the flowchart illustrated in FIG. 11.
Figure 14:
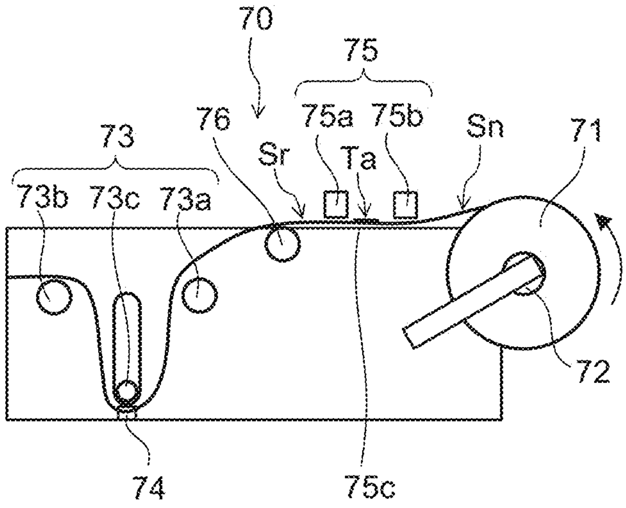
FIG. 14 is a diagram illustrating the supply part of the image forming apparatus in a case where the processing is performed in a different order from the flowchart illustrated in FIG. 11.

FIG. 11 is a flowchart for explaining the transition from roll replacement state C8 to printing standby state C4 in image forming apparatus 1. FIG. 12 is a diagram illustrating supply part 70 of image forming apparatus 1 in the case where the motor of tension applying part 72 is rotated and tension is applied to continuous medium S in the order according to the flowchart illustrated in FIG. 11. FIG. 13 is a diagram illustrating supply part 70 of image forming apparatus 1 in the case where the holding of continuous medium S at holding part 751 is released in the order according to the flowchart illustrated in FIG. 11. FIG. 14 is a diagram illustrating supply part 70 of image forming apparatus 1 in a case where the processing is performed in a different order from the flowchart illustrated in FIG. 11.

Here again, supply part 70 will be described as an example, and it is assumed that continuous medium S is held by holding part 851 at the collection part 80 side, for example.

(Step S21)

In the roll replacement state, control part 200 checks whether or not the roll replacement button is off. When the roll replacement button is off (YES), the process proceeds to step S22, and when the roll replacement button is not off (NO), step S21 is repeated.

(Step S22)

Control part 200 rotates the motor of tension applying part 72 stopped in above-described step S13, to apply tension to continuous media Sr and Sn (see FIG. 12). At this time, first clamp 75*a* and second clamp 75*b* of splice table 75 have been moved downward, and respectively hold continuous media Sr and Sn between the clamps and table 75*c*. Holding part 751 (first clamp 75*a* and table 75*c*) holds continuous medium Sr and maintains the tension of continuous medium Sr.

(Step S23)

Control part 200 moves first clamp 75*a* and second clamp 75*b* upward to release the holding of continuous medium Sr at holding part 751 having held continuous medium S in above-described step S12. The holding of continuous medium Sr between second clamp 75*b* and table 75*c* is also released (see FIG. 13).

As is understood, prior to releasing the holding of continuous media Sr and Sn at holding part 751, the motor of tension applying part 72 is rotated to apply tension to continuous media Sr and Sn. Thus, in section SD (see FIG. 3), the tension of continuous medium Sr can be reliably maintained, and the tension of continuous medium Sr can be maintained also in section SC.

When the order of step S22 and step S23 is reversed, the holding of continuous medium S at holding part 751 is released prior to application of the tension to continuous media Sr and Sn by rotation of the motor of tension applying part 72.

In this case, holding part 751 releases the holding of continuous medium Sr at holding part 751, whereby the tension of continuous medium Sr in section SD that is maintained by holding continuous medium Sr is lost. At this time, at tension adjustment part 73, dancer roller 73*c* moves downward due to the weight of dancer roller 73*c*, and a corresponding portion of continuous medium Sr droops downward (see FIG. 14). This is the same state as the steady state illustrated in FIG. 4, in which the tension of continuous medium Sr in section SC is also lost, continuous medium S is not placed along the predetermined conveyance path, and the preliminary operation cannot be executed.

Therefore, in order to maintain the tension of continuous medium Sr in sections SD and SC, it is required to rotate the motor of tension applying part 72 to apply the tension to continuous media Sr and Sn prior to releasing the holding of continuous medium Sr at holding part 751.

(Step S24)

Control part 200 transitions from roll replacement state C8 to printing standby state C4 as the apparatus state. The apparatus state of image forming apparatus 1 becomes the printing standby state illustrated in FIG. 1.

Here, although supply part 70 has been described as an example, the same procedure is also applied to collection part 80. Repetitive descriptions of the same procedure will be omitted. In this case, it is assumed that continuous medium S is held by holding part 751 at the supply part 70 side, for example.

Transition from Roll Replacement State to Steady State

The transition from roll replacement state C8 to steady state C2 described above will be described later with reference also to FIG. 15.

Figure 15:
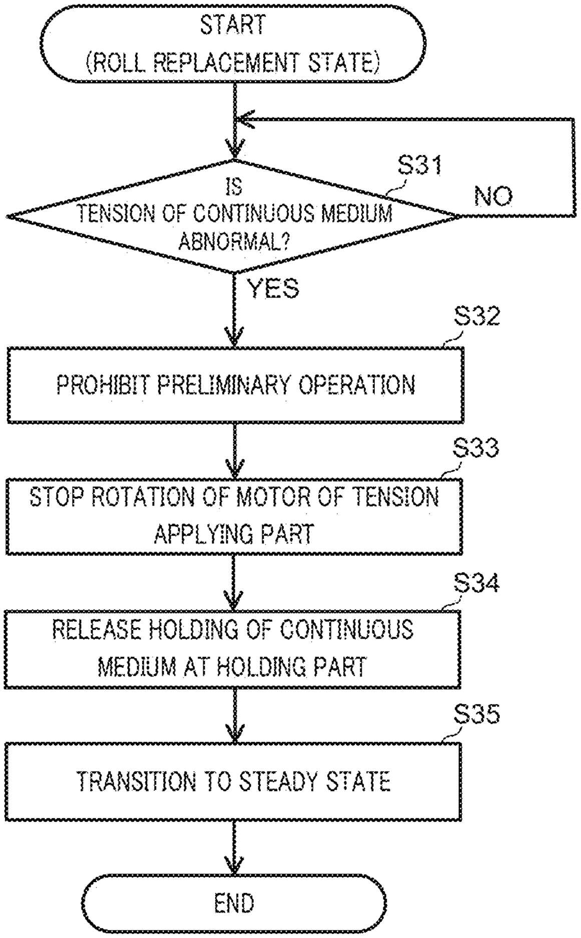
FIG. 15 is a flowchart illustrating a transition from the roll replacement state to the steady state in the image forming apparatus illustrated in FIG. 1.

FIG. 15 is a flowchart for explaining the transition from roll replacement state C8 to steady state C2 in image forming apparatus 1.

When the tension of continuous medium S is abnormal, control part 200 transitions from roll replacement state C8 to steady state C2 as the apparatus state.

(Step S31)

In the roll replacement state, control part 200 checks whether or not the tension of continuous medium S is abnormal. For example, control part 200 checks whether or not the tension of continuous medium S is abnormal by using the above-described tension detection parts 74 and 84. When the tension of continuous medium S is abnormal (YES), the process proceeds to step S32, and when the tension of continuous medium S is not abnormal (NO), step S31 is repeated.

(Step S32)

Control part 200 prohibits the preliminary operation. Control part 200 prohibits the above-described preliminary operation, for example, a preliminary operation such as warm-up of fixing part 60.

(Step S33)

Control part 200 stops the rotation of the motors of tension applying parts 72 and 82, to stop the application of tension to continuous medium S.

(Step S34)

Control part 200 releases the holding of continuous medium S at holding parts 751 and 851 holding continuous medium S.

Specifically, control part 200 moves first clamp 75*a* upward to release the holding of continuous medium S at holding part 751. At this time, when second clamp 75*b* holds continuous medium S between itself and table 75*c*, second clamp 75*b* is also moved upward to release the holding of continuous medium S at that portion. Further, first nip roller 85*a* and second nip roller 85*b* are separated from each other to release the holding of continuous medium S at holding part 851.

(Step S35)

Control part 200 transitions from roll replacement state C8 to steady state C2 as the apparatus state. The apparatus state of image forming apparatus 1 becomes the steady state illustrated in FIG. 4.

Summary

As described above, image forming apparatus 1 of the present embodiment includes tension maintaining parts 701 and 801 that maintain the tension of continuous medium S in image-forming-apparatus main part 100 at the time of a manipulation for replacing at least one of first roll 71 and second roll 81.

Further, in the control method of the image forming apparatus according to the present embodiment, tension maintaining parts 701 and 801 are operated to maintain the tension of continuous medium S in image-forming-apparatus main part 100 at the time of a manipulation for replacing at least one of first roll 71 and second roll 81.

According to the image forming apparatus and the control method of the present embodiment configured as described above, first roll 71 and second roll 81 can be replaced in a state where the tension of continuous medium S in image-forming-apparatus main part 100 is maintained.

Holding parts 751 and 851 hold tensioned continuous medium S not only in the printing standby state and the printing state but also during the roll replacement. Thus, the preliminary operation can be performed even in the roll replacement state. Therefore, downtime of the apparatus can be reduced. Further, by performing the preliminary operation during the roll replacement, the number of preliminary operations in the printing state can be reduced, and the efficiency of image formation (printing) can also be improved.

In addition, since holding parts 751 and 851 hold tensioned continuous medium S during the roll replacement, continuous medium S is disposed along a predetermined conveyance path in image forming apparatus 1 including image-forming-apparatus main part 100. Therefore, continuous medium S does not enter a portion other than the conveyance path during the roll replacement, and for example, when the conveyance of continuous medium S is resumed, a conveyance trouble or the like is not caused. As a result, downtime of the apparatus can be reduced.

OTHER EMBODIMENTS

In the above-described embodiment, an image forming apparatus using an electrophotographic process technology is described as an example of image-forming-apparatus main part 100, but the present invention is also applicable to an image forming apparatus using an inkjet technology as image-forming-apparatus main part 100.

Note that, the aforementioned embodiments merely describe examples of implementations for practicing the present invention and should not be construed as limiting the technical scope of the present invention. That is, the present invention can be embodied in various forms without departing from the spirit, scope, or principal features of the present invention.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus, comprising:

a main part that forms an image on a continuous medium in a state in which a tension is applied to the continuous medium, the continuous medium being fed from a first roll and conveyed to be taken up on a second roll; and a tension maintaining part that maintains the tension of the continuous medium at the main part during a manipulation for replacing at least one of the first roll and the second roll;

wherein:

the tension maintaining part includes:

a tension applier that applies a predetermined tension to the continuous medium, and a holder that holds the continuous medium in a state in which the predetermined tension is applied to the continuous medium, and when the image forming apparatus transitions from an image formable state to a roll replacement state, the holder is operated such that the holder holds the continuous medium, and thereafter stops the tension applier applying the tension.

2. The image forming apparatus according to claim 1, wherein during the manipulation, the main part performs a preliminary operation of image formation while the tension is maintained.

3. The image forming apparatus according to claim 1, wherein the tension maintaining part includes:

a tension applier that applies a predetermined tension to the continuous medium, and a holder that holds the continuous medium in the state in which the predetermined tension is applied to the continuous medium.

4. The image forming apparatus according to claim 3, wherein the holder holds at least one of an upstream side and a downstream side of the continuous medium with respect to the main part in a conveyance direction in which the continuous medium is conveyed.

5. The image forming apparatus according to claim 3, wherein the holder includes a nip roller that nips and conveys the continuous medium.

6. The image forming apparatus according to claim 3, further comprising:

a splice table that presses the continuous medium onto a table with a clamp when the continuous medium is cut or the continuous medium is connected to one another;

wherein the holder includes the clamp.

7. The image forming apparatus according to claim 1, further comprising:

a tension detector that detects the tension of the continuous medium at the main part, wherein when the tension detected is abnormal, the tension maintaining part terminates an operation of maintaining the tension depending on the manipulation.

8. The image forming apparatus according to claim 3, wherein:

the tension maintaining part further includes a tension adjustment part that adjusts the tension of the continuous medium, and the tension adjustment part is disposed on the main part side of the holder in a conveyance direction in which the continuous medium is conveyed.

9. The image forming apparatus according to claim 8, wherein the tension adjustment part includes a dancer roller that is disposed to be vertically movable and that applies its own weight to the continuous medium.

10. The image forming apparatus according to claim 9, further comprising:

a tension detector that detects that the tension is abnormal, when the dancer roller is at a lowermost portion or an uppermost portion of a range of vertical movement.

11. The image forming apparatus according to claim 1, further comprising:

a hardware processor that controls the image forming apparatus based on an instruction from a user by manipulation, wherein the hardware processor permits a preliminary operation of image formation, when transitioning, in accordance with the instruction of the user, to the roll replacement state for replacing at least one of the first roll and the second roll.

12. The image forming apparatus according to claim 11, wherein when the hardware processor is in an image formable state in which starting formation of the image is allowed, the hardware processor transitions to the roll replacement state in accordance with the instruction of the user.

13. The image forming apparatus according to claim 11, wherein when the hardware processor is in the roll replacement state, the hardware processor transitions to an image formable state in which starting formation of the image is allowed, in accordance with an instruction from the user.

14. The image forming apparatus according to claim 13, wherein:

the tension maintaining part includes:

a tension applier that applies a predetermined tension to the continuous medium, and a holder that holds the continuous medium in a state in which the predetermined tension is applied to the continuous medium, and when the hardware processor transitions from the roll replacement state to the image formable state, the hardware processor starts the tension applier applying a tension, and thereafter operates the holder such that holding of the continuous medium is released.

15. The image forming apparatus according to claim 11, wherein:

the tension maintaining part includes:

a tension applier that applies a predetermined tension to the continuous medium, and a holder that holds the continuous medium in a state in which the predetermined tension is applied to the continuous medium, and when the tension is abnormal in the roll replacement state, the hardware processor releases the roll replacement state, operates the holder such that holding of the continuous medium is released, and stops the tension applier applying the tension.

16. A control method of an image forming apparatus, comprising:

forming an image on a continuous medium by a main part of the image forming apparatus in a state in which a tension is applied to the continuous medium, the continuous medium being fed from a first roll and conveyed to be taken up on a second roll;

operating a tension maintaining part to maintain the tension of the continuous medium at the main part during a manipulation for replacing at least one of the first roll and the second roll;

wherein:

the tension maintaining part includes:

a tension applier that applies a predetermined tension to the continuous medium, and a holder that holds the continuous medium in a state in which the predetermined tension is applied to the continuous medium, and when the image forming apparatus transitions from an image formable state to a roll replacement state, the holder is operated such that the holder holds the continuous medium, and thereafter stops the tension applier applying the tension.

* * * * *